Figure 1:
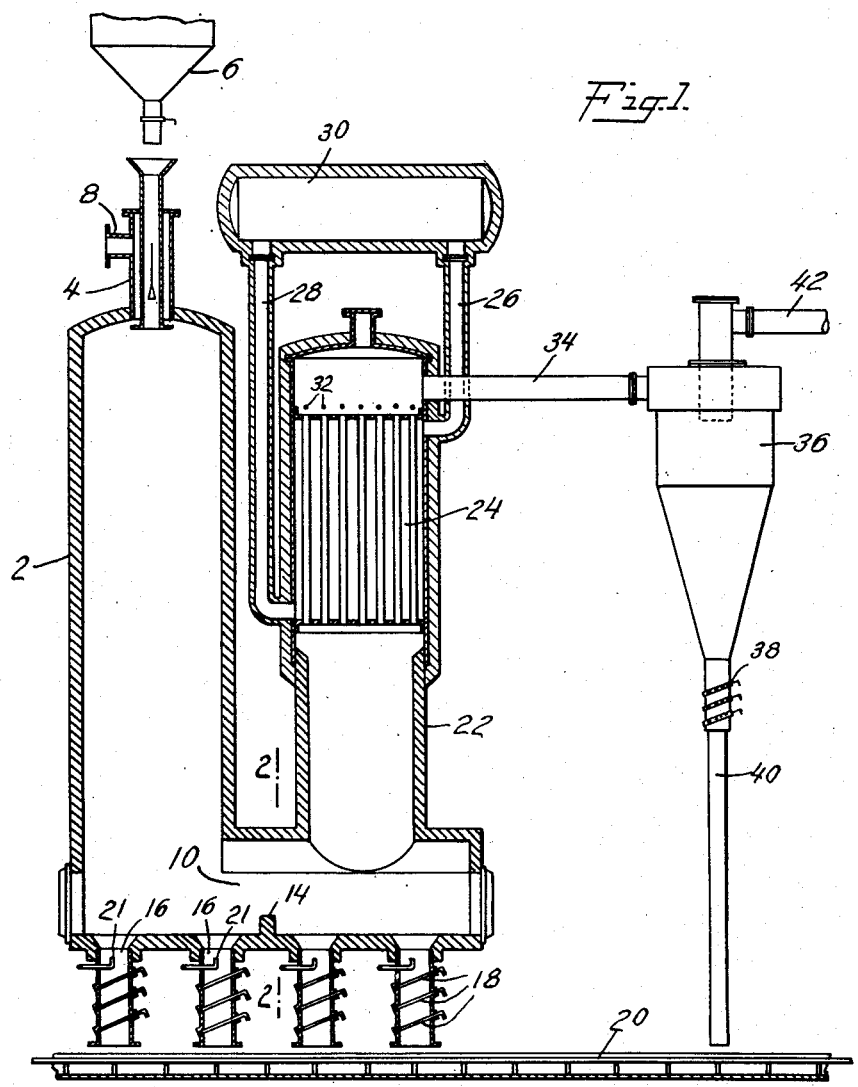

Jan. 1, 1935.

C. A. MacDONALD 1,985,902

CONCENTRATE BURNER

Filed June 5, 1931

INVENTOR
Charles A. MacDonald
BY
ATTORNEY

Patented Jan. 1, 1935

1,985,902

UNITED STATES PATENT OFFICE 1,985,902

CONCENTRATE BURNER

Charles A. MacDonald, New York, N. Y., assignor to General Chemical Company, New York, N. Y., a corporation of New York Application June 5, 1931, Serial No. 542,269

8 Claims. (Cl. 266—16)

My invention relates to apparatus and processes for removing dust from sulfur dioxide and the product of combustion produced by burning or roasting sulfide ores, flotation concentrates and similar finely divided combustible materials in suspension.

Sulfur dioxide is produced from sulfide ores and particularly pyrites, flotation concentrates and the like by burning the materials in finely divided form and while in suspension in a shaft furnace such as that disclosed in the United States Patent to Cordy et al., 1,758,188, patented May 13, 1930. In the shaft furnace described in said patent, finely divided sulfide ores and air are introduced into the top of a furnace which is in the form of a vertical column heated to a high temperature and the ore and air together with the sulfur dioxide and resulting products of combustion pass downwardly to an outlet communicating with the lower portion of the furnace. The gases then pass through a dust collecting chamber wherein dust entrained therein is deposited. However, the gases leaving the dust collecting chamber ordinarily still contain substantial amounts of finely divided dust in suspension and therefore the gases must be treated further to remove the suspended dust therefrom. The dust produced consists largely of metallic oxides, for example iron oxide, when the material burned is pyrites. The dust recovered, therefore, constitutes a valuable by-product from the operation.

It has been proposed to pass the hot gases from the dust-collecting chamber through a cyclone separator for removing suspended dust from the gases after they have been passed through the dust collecting chamber. However, the gases leaving the furnace and passing from the dust-collecting chamber are ordinarily at a temperature of about 1700° to 2000° F. and therefore in practice it is found that cyclone separators and similar apparatus used for separating the finely divided and suspended dust must be made of special and expensive materials, such as chrome steel and must be of very large capacity in order to accommodate the large volume of gases passed therethrough. It is also found in some instances that the dust collecting in the collecting chamber has not been completely burned and therefore contains substantial amounts of sulfur. This unburned sulfur represents a loss in the amount of sulfur dioxide produced and increases the sulfur content of the dust rendering the same unsuitable for further use or of inferior quality.

In accordance with my invention the disadvantages heretofore encountered in the treatment of sulfide ore, flotation concentrates and the like in shaft furnace are overcome and the cost and maintenance of the apparatus used is comparatively low. In practicing the process of my invention the gases leaving the dust collecting chamber and containing finely divided dust in suspension are passed into contact with a heat exchange device such as a tubular boiler whereby the volume and velocity of the gases are reduced and dust carried by the gases is deposited. The heat exchange device is preferably located above the dust-collecting chamber so that the dust thus deposited falls back into the dust-collecting chamber and is removed with the dust deposited by the gases as they pass through the dust-collecting chamber. The gases, after being passed in contact with the heat exchange device, are at relatively low temperatures, say 500° to 600° F. and are correspondingly decreased in volume and velocity. The cooled gases are then passed into a cyclone separator where any remaining dust is separated from the gases and the cooled gases substantially free from dust are passed to further apparatus for utilizing the $SO_2$ produced for manufacturing sulfuric acid or for other purposes.

Supplemental air is introduced near the bottom of the dust-collecting chamber for the purpose of aiding the combustion of any incompletely oxidized material depositing in the chamber, so as to more completely desulfurize the material prior to its discharge from the chamber.

Among the objects of my invention are to provide an improved method and apparatus for removing dust from sulfur dioxide and the products of combustion produced in burning finely divided sulfide ores, flotation concentrates and similar combustible materials in suspension, to utilize the heat contained in said products of combustion in producing steam and to reduce the cost and increase the efficiency of the apparatus employed.

A further object of the invention is to effect substantially complete combustion of unoxidized materials introduced into the shaft furnace and to reduce the sulfur content of the metallic oxide dust formed in the operation.

Figure 2:
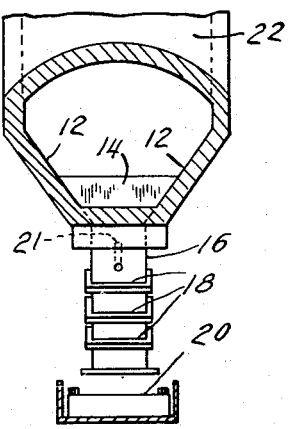

These and other objects and features of my invention will appear from the following description thereof in which reference is made to the accompanying figures of the drawing illustrating a preferred embodiment of my invention, In the drawing, Fig. 1 is a vertical sectional view of the preferred form of my invention, parts of the apparatus being shown in full lines; and Fig. 2 is a vertical sectional view taken at right angles to Fig. 1 on the line 2—2.

In the form of the invention illustrated in the drawing, a shaft furnace 2 is provided with suitable feeding mechanism 4 for introducing air and the sulfide ore, flotation concentrates or other material to be burned into the furnace. The feeding mechanism used may be of any suitable type such as that described in the patent to Cordy et al. referred to above, whereby part of the air introduced with the sulfide ore serves to prevent the ore from coming into contact with the walls of the furnace. The ore is supplied to the feeding mechanism from a hopper 6 and the air for supporting combustion of the ore is supplied to the feeding mechanism through the conduit 8.

The lower portion of the furnace 2 communicates with a horizontally extending dust collecting chamber 10 through which the sulfur dioxide and products of combustion from the furnace are passed. The chamber 10 is provided with sloping sides 12 onto which the dust and burned ore are deposited from the gases passing through the chamber. A baffle member 14 extends across the lower portion of the chamber to increase the turbulence of the gases passing therethrough and aid in the removal of dust from the gases. The dust collecting on the bottom and sloping sides of the chamber 10 passes into the chutes 16 and is removed through the triple doors 18. The doors 18 serve to maintain the gases in the apparatus under substantially constant pressure and permit operation of the apparatus under positive pressure, if desired. The dust thus removed from the gases is passed through the chutes 16 onto the conveyor 20 and may be transported to storage bins or apparatus for using the same.

In some instances the dust or material deposited in the chamber 10 is incompletely burned so that the resulting metallic oxide contains sulfur which decreases the value of the dust materially. I therefore introduce supplemental air into the dust collecting chamber to insure complete combustion of the dust collected in the chamber 10. For this purpose air inlets 21 are located in the chutes 16 or elsewhere in the dust-collecting chamber 10 for introducing air into the chamber. The air thus introduced comes into contact with the dust depositing in the chamber, insuring complete combustion of this material prior to its removal through the chutes 16.

The gases passing from the horizontal chamber 10 and containing finely divided material in suspension, are then treated to remove additional dust therefrom. For this purpose the end of the chamber 10 remote from the furnace is provided with a portion 22 extending vertically from the chamber and communicating with a suitable heat exchange device 24 such as a tubular boiler. The boiler 24 may be either a water tube boiler or a fire tube boiler and is of sufficient capacity to cool the gases and reduce the volume and velocity thereof so that dust and particles carried in suspension in the gases are deposited from the gases. The boiler 24 is so positioned with reference to the chamber 10, that dust deposited from the gases in cooling the same falls back into the chamber 10.

The boiler 24 is connected by suitable pipes 26 and 28 to a steam chamber 30 from which steam can be withdrawn for use in the plant in which the apparatus is employed. The upper portion of the boiler above the tubes may also be provided with suitable soot blowing devices 32.

The upper end of the vertical portion 22 of the chamber 10 is provided with a gas offtake 34 through which the cooled gases are passed to a cyclone separator 36 for removing any remaining dust from the gases. The dust separated from the gases in the cyclone separator is removed through triple doors 38 and the chute 40 and is carried away by the conveyor 20. The cooled and cleaned gases leave the separator through the pipe 42 connected to the top of the separator and can be used for the production of sulfuric acid or for the manufacture of paper pulp or for other purposes.

In operating the apparatus described above, the ore and air are introduced into the furnace 2 in the desired proportion for effecting combustion of the material. These proportions will vary with the character and composition of the ore or flotation concentrate or other material being burned. Both the air and ore are first dried and the furnace into which the ore and air are introduced is initially heated to a high temperature. The ore entering the furnace is thereby ignited and burned to produce sulfur dioxide leaving a residue of metallic oxides in the form of dust. The gases produced together with the material being burned pass downwardly through the furnace and into the horizontally extending dust collecting chamber 10. A large part of the dust contained in the gases is removed in the chamber 10 and the supplemental air introduced through the air inlets 21 aids in completing the combustion of any incompletely oxidized material depositing in the chamber 10.

The gases containing some suspended dust then pass upwardly from the chamber 10 through the vertical portion 22 and over the heat exchange device 24. The gases leaving the chamber 10 and passing into contact with the heat exchange device are ordinarily at a temperature from 1700° to 2000° F. In passing over the heat exchange device, the gases are reduced in temperature to approximately 500° to 600° F. giving up their heat to the water in the heat exchange device and converting the same into steam. The gases are thus reduced in volume and the velocity thereof is correspondingly reduced so that dust carried in suspension by the gases is deposited and falls back into the dust collecting chamber 10 and is removed with that dust previously deposited in the chamber 10 as the gases pass horizontally therethrough.

After passing over the heat exchange device the cooled gases are subjected to further treatment to remove additional dust and finely divided material therefrom and preferably are passed through a cyclone separator wherein the dust is deposited and the cleaned cooled gases pass from the cyclone separator to suitable apparatus for producing sulfuric acid, manufacturing paper or for other purposes. The dust separated from the gases and collecting in the chamber 10 and in the cyclone separator 36 consists very largely of metallic oxides, such as iron oxide if the ore used is pyrites, and this dust is valuable as a by-product. The dust is therefore removed from the dust collecting chamber and cyclone separator and carried by the conveyor 20 to a storage bin, furnace or other means for storing or using the same.

The combination of apparatus elements herein described is of particular value in that the gases are cooled prior to their passage through the cyclone separator and by reason of the reduced volume and temperature of the gases the apparatus may be constructed of comparatively cheap materials and is relatively small in size as compared with the apparatus that is necessary when the gases are not cooled and partially cleaned prior to their passage into the cyclone separator or other dust removing apparatus. The apparatus therefore is less expensive to construct and maintain than similar apparatus heretofore proposed for this purpose.

While I have illustrated and described a preferred form of apparatus embodying my invention, it should be understood that the form thereof is illustrative of my invention and is not intended to limit the scope thereof.

I claim:

1. The combination with a furnace having a combustion chamber in which metal sulfide materials in pulverized form are burned in suspension to produce sulfur dioxide, of means for collecting dust from the gases and products of combustion produced in said furnace comprising a dust-collecting chamber communicating with the combustion chamber of said furnace and a heat exchange device adjacent the furnace and located above the dust collecting chamber in the path of flow of said gases and products of combustion, said heat exchange device being positioned to cool said products of combustion and cause dust to be deposited therefrom and collect in said dust collecting chamber.

2. Apparatus for burning metal sulfide materials in pulverized form to produce sulfur dioxide and for collecting dust from the gases produced by combustion of said materials comprising in combination a furnace having a combustion chamber, a dust collecting chamber having one end communicating with the combustion chamber whereby gases from said combustion chamber pass through the dust collecting chamber, a tubular boiler the gas cooling passage of which communicates with said dust collecting chamber, said tubular boiler being positioned above said dust collecting chamber to cause dust deposited from said gases while passing through the gas space of the tubular boiler to be dropped into said dust collecting chamber.

3. The combination with a furnace having a combustion chamber in which metal sulfide materials in pulverized form are burned in suspension to produce sulfur dioxide, of means for collecting dust from the gases and products of combustion produced in said furnace comprising a dust-collecting chamber communicating with the lower portion of the combustion chamber of said furnace, a heat exchange device adjacent the furnace communicating with said dust collecting chamber and located above the same in the path of flow of said gases from said dust collecting chamber, said heat exchange device being positioned to cool said gases and cause dust to deposit therefrom and drop in said dust collecting chamber, and means for removing dust from said gases after they have been cooled.

4. The combination with a furnace having a combustion chamber in which metal sulfide materials in pulverized form are burned in suspension to produce sulfur dioxide, of means for collecting dust from the products of combustion produced in said furnace combustion chamber comprising a dust collecting chamber communicating with said furnace combustion chamber adapted to collect dust from said products of combustion, and means for introducing supplemental air into said dust collecting chamber to aid in the combustion of said materials.

5. The combination with a furnace having a combustion chamber in which metal sulfide materials in pulverized form are burned in suspension to produce sulfur dioxide, of means for collecting dust from the gases and products of combustion produced in said furnace comprising a dust collecting chamber communicating with the lower portion of the combustion chamber of said furnace, means for introducing supplemental air into said dust collecting chamber to aid in the combustion of said materials, a heat exchange device having a gas cooling passage communicating with said dust collecting chamber and positioned above the same in the path of flow of said gases from said dust collecting chamber to cool said gases and cause dust to deposit therefrom and collect in said chamber.

6. In apparatus for burning metal sulfide materials in pulverized form and in suspension to produce sulfur dioxide and for removing dust from the gases produced by combustion of said materials comprising a shaft furnace having a combustion chamber, means for introducing the material to be burned into the top of said combustion chamber, means for introducing air for effecting combustion of said materials into said combustion chamber, a dust collecting chamber communicating with said combustion chamber near the bottom thereof through which the gases and products of combustion from said combustion chamber are passed, a tubular boiler having a gas cooling passage communicating with said dust collecting chamber and located above the same to cool the gases passed through said dust collecting chamber, said boiler being positioned to deposit dust from the gases and cause the dust to drop into said chamber.

7. In apparatus for burning metal sulfide materials in pulverized form and in suspension to produce sulfur dioxide and for removing dust from the gases produced by combustion of said materials comprising a shaft furnace having a vertically disposed combustion chamber, means for introducing the material to be burned into the top of said combustion chamber, means for introducing air for effecting combustion of said materials into said combustion chamber, a horizontally disposed dust collecting chamber communicating with said combustion chamber at the bottom thereof through which the gases and products of combustion from said combustion chamber are passed, means for introducing supplemental air into said dust collecting chamber to aid in the combustion of said materials, a tubular boiler having a vertically arranged gas passage communicating with said dust collecting chamber and located above the same to cool the gases passed through said dust collecting chamber, said boiler being positioned to precipitate dust from the gases and cause the dust to drop into said chamber, and means for removing dust from the gases after they have passed in contact with said boiler.

8. The combination with a furnace having a combustion chamber in which metal sulfide materials in pulverized form are burned in suspension to produce sulfur dioxide, of means for collecting dust from the gases and products of combustion produced in said furnace comprising a dust collecting chamber communicating with said furnace combustion chamber and adapted to collect dust from said gases, a heat exchange device having a gas cooling space communicating with the dust collecting chamber to cool gases passed through said dust collecting chamber whereby the temperature of said gases is reduced and the volume and velocity thereof decreased, and means communicating with the outlet of the gas cooling space of said heat exchange device for collecting dust from said gases after they have been cooled by contact with said heat exchange device.

CHARLES A. MACDONALD.